US006948596B2

(12) United States Patent
Van Wouw

(10) Patent No.: US 6,948,596 B2
(45) Date of Patent: Sep. 27, 2005

(54) DUAL-ACTING BAND BRAKE

(75) Inventor: Rob Van Wouw, Cary, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/982,915

(22) Filed: Oct. 19, 2001

(65) Prior Publication Data

US 2003/0075398 A1 Apr. 24, 2003

(51) Int. Cl.$^7$ ............................................. F16D 51/00
(52) U.S. Cl. .................................. 188/77 W; 188/77 R
(58) Field of Search .............................. 188/77 R, 77 W

(56) References Cited

U.S. PATENT DOCUMENTS

| 206,916 | A | * | 8/1878 | Runkle | 182/240 |
|---|---|---|---|---|---|
| 698,262 | A | * | 4/1902 | Crowdus | 188/77 R |
| 707,442 | A | * | 8/1902 | Moon | 188/77 R |
| 715,231 | A | * | 12/1902 | Crowdus | 188/77 R |
| 774,448 | A | * | 11/1904 | Norris | 188/161 |
| 1,121,222 | A | * | 12/1914 | Alexander | 188/77 R |
| 1,124,291 | A | * | 1/1915 | Caldwell | 188/206 R |
| 2,660,264 | A | * | 11/1953 | Richardson | 188/361 |
| 4,053,032 | A | * | 10/1977 | McDonald | 188/77 R |
| 4,129,201 | A | | 12/1978 | Tamura | 188/76 |
| 4,384,637 | A | * | 5/1983 | Runkle | 188/140 A |
| 4,778,036 | A | * | 10/1988 | Nowak | 188/249 |
| 4,815,679 | A | | 3/1989 | Perry | 244/111 |
| 4,891,959 | A | * | 1/1990 | Wood | 188/171 |
| 5,131,509 | A | * | 7/1992 | Moon et al. | 188/77 R |
| 5,246,093 | A | | 9/1993 | Wang | 188/336 |
| 5,501,304 | A | * | 3/1996 | Fini, Jr. | 188/250 H |
| 5,529,151 | A | | 6/1996 | Fukasawa et al. | 188/77 |
| 5,735,368 | A | | 4/1998 | Kobayashi et al. | 188/73.39 |
| 5,921,355 | A | * | 7/1999 | Mostrom | 19/105 |
| 6,044,937 | A | | 4/2000 | Yamada | 188/77 |
| 6,068,093 | A | | 5/2000 | Fujita et al. | 188/77 |
| 6,112,863 | A | | 9/2000 | Colletti | 188/77 |
| 6,182,802 | B1 | | 2/2001 | Dairokuno | 188/74 |
| 6,260,671 | B1 | * | 7/2001 | Fujita | 188/259 |

FOREIGN PATENT DOCUMENTS

DE 925489 3/1955

OTHER PUBLICATIONS

Copies of three (3) photographs by Deere & Company employees of a band brake used on equipment manufactured by John Deere, photos taken in Sep. and Oct. 2000 in U.S.A.
John Deere Parts Catalog—PC2317, LX172, LX173, LX176, LX186 and LX188 Lawn Tractors, pp. 52–20–52–23, date of last publication Apr. 2001, published in U.S.A.
John Deere Technical Manual—TM 1778, "Mid–Mount Z Trak M653/655/665", in particular Chapter 6, date of last publication Sep. 1999, published in U.S.A.
John Deere Operator's Manual—OMM138801 F9, "Mid–Mount Z Trak M653, and M665", in particular pp. 45, 73 and 102, date of last publication Jun. 1999, published in U.S.A.

* cited by examiner

Primary Examiner—Robert A. Siconolfi
Assistant Examiner—Melanie Torres

(57) ABSTRACT

A band brake for retarding the motion of an associated rotatable member. The brake acts to resist motion of the rotatable member through actuation of both of its ends by a cylindrical actuating member. The band is connected with and carried by actuator so as to allow the band to move with and respond in the same direction as the actuator. In doing so, greater opportunity exists for the structure connecting the band to the actuator to withstand and resist yielding upon application of force to the actuator.

3 Claims, 4 Drawing Sheets

DUAL-ACTING BAND BRAKE

FIELD OF THE INVENTION

This invention relates to a band brake that permits increased braking capacity and structural integrity while being small enough to fit within a confined space such as the wheel hub of a vehicle with which it is associated.

BACKGROUND OF THE INVENTION

It is commonly known that a band brake assembly has been used to retard the rotational force of a rotatable drum with which a ground engaging wheel of a vehicle is connected. The band brake applies a frictional force to the outer surface of the drum. When applied, this frictional force acts to slow rotation of the wheel by counteracting a torque or rotational force conveyed to the drum by the vehicle transmission. Upon sufficient application of this frictional force, the drum and the wheel with which it is associated will slow or cease to rotate.

Band brakes, in general, have been used according to at least two designs for applications which include and extend beyond retarding motion of a wheel. Many of the designs have shared similar or common features. Among these features are the mounting of the band around the rotatable member whose motion it is to slow or stop. Specifically, the brake has ordinarily consisted of a clamp-like or C-shaped metal band that includes a lining of frictional material applied to an inner surface thereof and which is then placed against an outer surface of the rotatable member. The two designs, as mentioned above, locate the band relative to the member in this manner and can be described as being "single-acting" or "dual-acting".

Single-acting and dual-acting band brakes differ from each other with respect to how the ends of the band are connected with the actuator used to tighten the band so as to determine how the band presses against the rotatable member. Single-acting brakes have included the stationary mounting of one end of the band to an anchor or part of the vehicle internal or external housing. The other end of the band has been movable and is often connected with an actuating member that, in turn, is associated with a hand or foot operated lever so as to allow the movable end to be moved as the actuator is moved. Connecting the band to a fixed support at one end while permitting the other end to be movable results in what has been known as a "cantilevered" support. This type of support can be described whereby one end of an element, such as the band, is free-standing and the other end is held stationary by connection with or mounting to a relatively immovable member.

Dual-acting brakes ordinarily include a mounting whereby an actuator of a particular description acts on both ends of the band to either push or pull the band together. With this pushing or pulling, the band becomes tightened and braking of the rotatable member occurs. Some of these dual-acting brakes have configurations which have both ends connected with an actuator.

The difference in the above descriptions or labelings is rooted in how the brake, as a whole, achieves its function of tightening the band around the drum so as to slow its rotation. The level of braking capacity, or force that is applied to the drum as a result of how the band is tightened against it, that may be delivered to the rotatable member has been dependent on the structural configuration of the brake and, particularly, the connection of the band to the actuator.

In each of the single and dual-acting brakes, the movable ends of the band have often been connected to their respective actuator at a single point or location. Upon movement of the actuator, the band ends are forced into motion which stresses the pins often used to connect the ends to the actuator. Stressing of the pins results from the pin or pins being mounted or connected with the actuator on a first end and not mounted thereto on a second end so as to provide a cantilevered post with which the band may be connected. Accordingly, the braking capacity available from either construction may be lost or greatly diminished since the pin or pins may become fatigued, leading to failure thereof, so as to not be able to adequately support the band.

In each of these designs, the mounting and actuating structure used to support and move the band, respectively, has often been placed outside of the rotatable member. Accordingly, the freedom to locate and size the band assembly and other structure necessary to operate the rotatable member, as in the case of wheel motor necessary to operate a wheel on a motorized vehicle, has been limited.

Thus, it would be beneficial to provide a band brake construction which possesses an ability to withstand the forces imposed upon it as braking occurs. Additionally, it would be beneficial to provide such a construction with an ability to fit within the wheel with which it is associated so as to permit flexibility in design and placement of components.

SUMMARY OF THE INVENTION

Thus, there is provided a band brake assembly which possesses an ability to resist active and repeated pressures often resulting in fatiguing and failure of the pin or pins when braking is undertaken. Further, there is provided a brake assembly which enables flexibility in the design placement thereof so as to avoid the unnecessary consumption of space which may otherwise affect the design placement of other vehicle components.

Simply stated, the braking components of the assembly include a cylindrical drum which is adapted to be securable with a wheel of intended size. To permit braking of the wheel, a metal band having frictional or braking material on an inner surface thereof is wrapped around the drum. In order to actuate the band and cause braking, the band is connected with a cylindrical actuator which is then connected with a lever so as to allow sufficient force to be communicated to the band and thereby permit an operator to slow or stop motion of the wheel.

The actuator is constructed with openings at an end thereof through which pins, carrying the band, are inserted so as to allow a majority of the force from the actuator to be placed on the band instead of the pins when the actuator is moved. Accordingly, as the actuator rotates, the pins move with the actuator and serve as carriers of the band permitting them to see substantially low amounts of force since they move in the same direction and with the actuator as braking occurs. Moreover, through connection of both ends of the band with a single cylindrical actuator, the assembly offers increased braking capacity since both ends of the band will be pulled tightly around the drum when braking is attempted.

In an effort to enable greater design flexibility as well, both ends of the band are connected with a single actuator, as mentioned above. The cylindrical construction and close proximity of the actuator in relation to the drum permit the actuator to be positionable within the inner circumference of an intended wheel. Thus, the actuator can be located in proximity to other structure, such as a wheel motor, instead of occupying space which would require other design considerations in the sizing of components such as the motor.

DESCRIPTION OF THE PREFERRED EMBODIMENT

Figure 1:
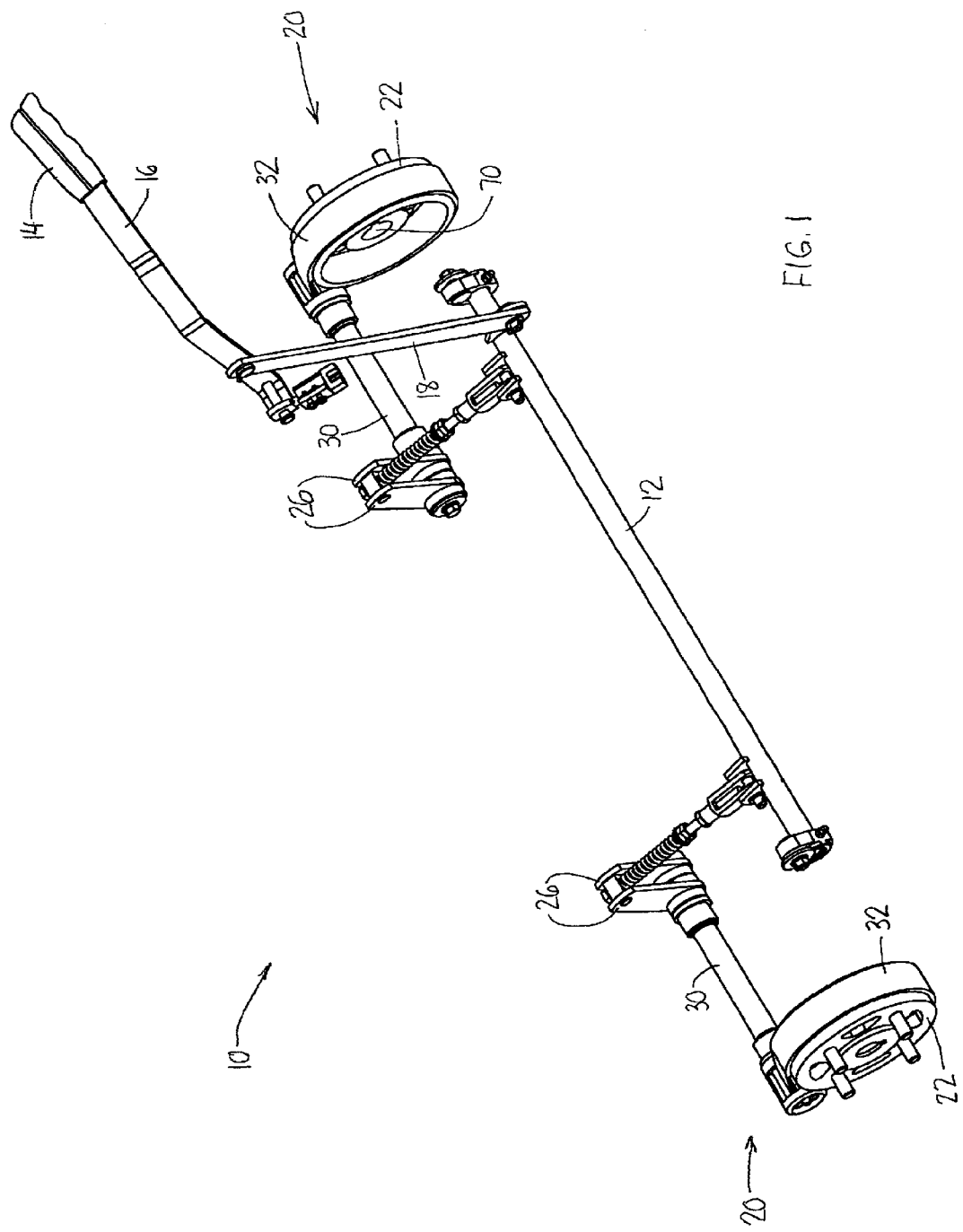
FIG. 1 is a side and elevated perspective view of the connection of the band brake assembly of the present invention to a shaft extending between the left and right side of the vehicle to which it is attached.

Looking to FIG. 1, there is shown the connection of a braking assembly 10 for use with a vehicle (not shown). The assembly 10 is shown connected on each of the left and right sides of the vehicle with a shaft 12 provided therebetween.

The braking assembly 10 consists of a brake lever 14 attached to and including an angular bar 16. The lever 14 is connected with a vertically extending linkage 18 for actuating a band assembly 20 to apply frictional force on the outer surface of a drum 22 and thereby retard motion of an attached wheel (not shown). While the preferred embodiment uses the band brake in conjunction with a vehicle wheel, it is to be understood that the band brake could be used with other rotating members. Connecting the band assembly 20 with the shaft 12 is a rod 24 attaching the shaft 12 to a pair of upstanding members 26 as is shown in FIG. 1. Disposed on the rod 24 is a spring 28 for biasing the lever 14 to a rearward position after the lever 14 has been moved to actuate the shaft and thus, the band assembly 20.

Figure 2:
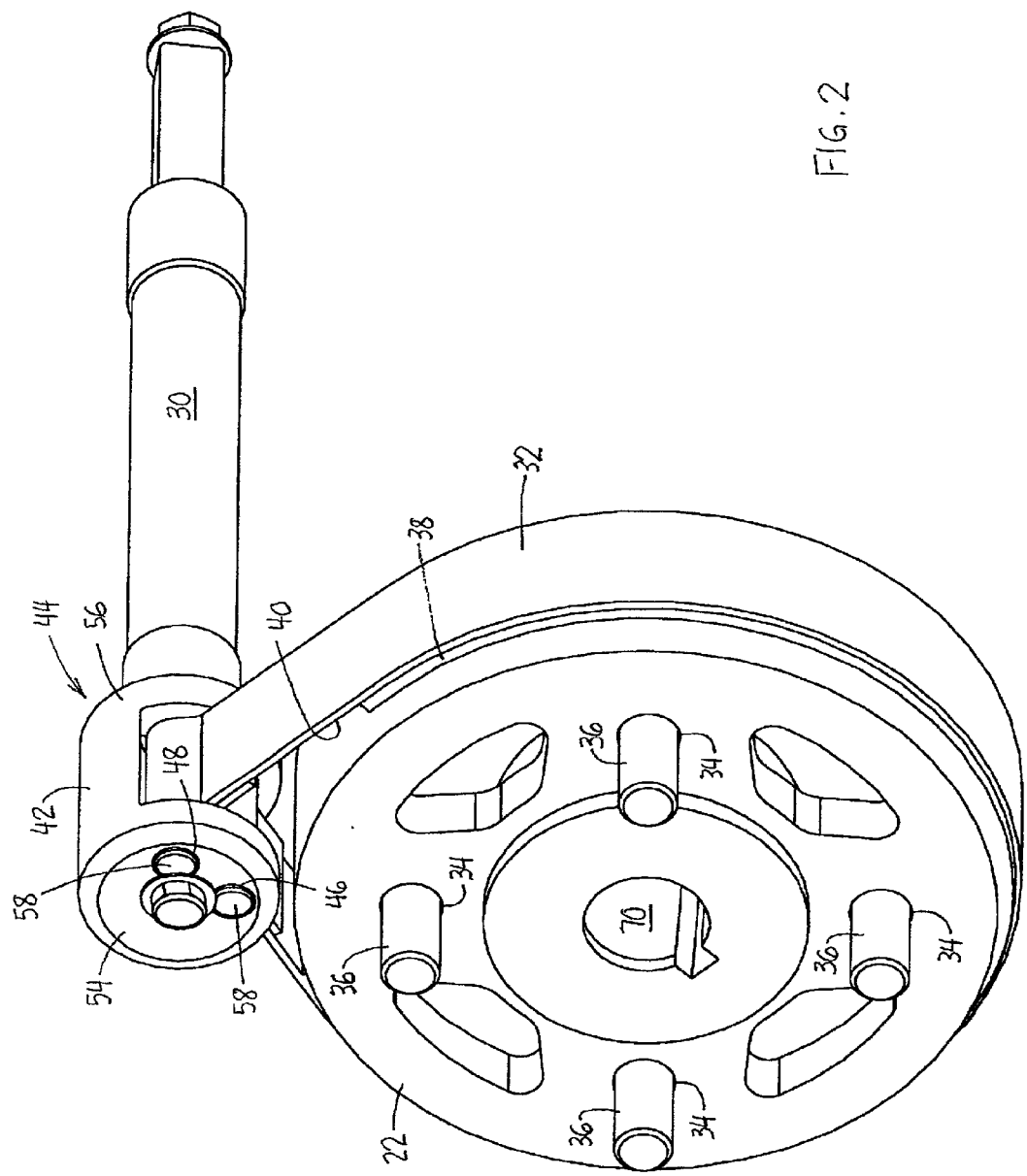
FIG. 2 is a side perspective view of the band brake assembly.

FIG. 2 displays the band brake assembly 20 of the instant invention. As seen therein, the band assembly 20 includes a cylindrical actuating member 30, preferably in the form of a rotatable shaft. Connected with the actuating member is a substantially C-shaped metal band 32. The band 32, as shown, is wrapped around the wheel drum 22 which includes a series of apertures 34 through which are disposed bolts 36 for connecting an intended wheel into which the assembly 20 is to be fitted within its inner circumference. As can further be seen in FIG. 2, the band 30 includes an extension of frictional material 38 on an inner surface 40 to be used in resisting motion of the drum 22 and thus, the wheel.

Figure 3:
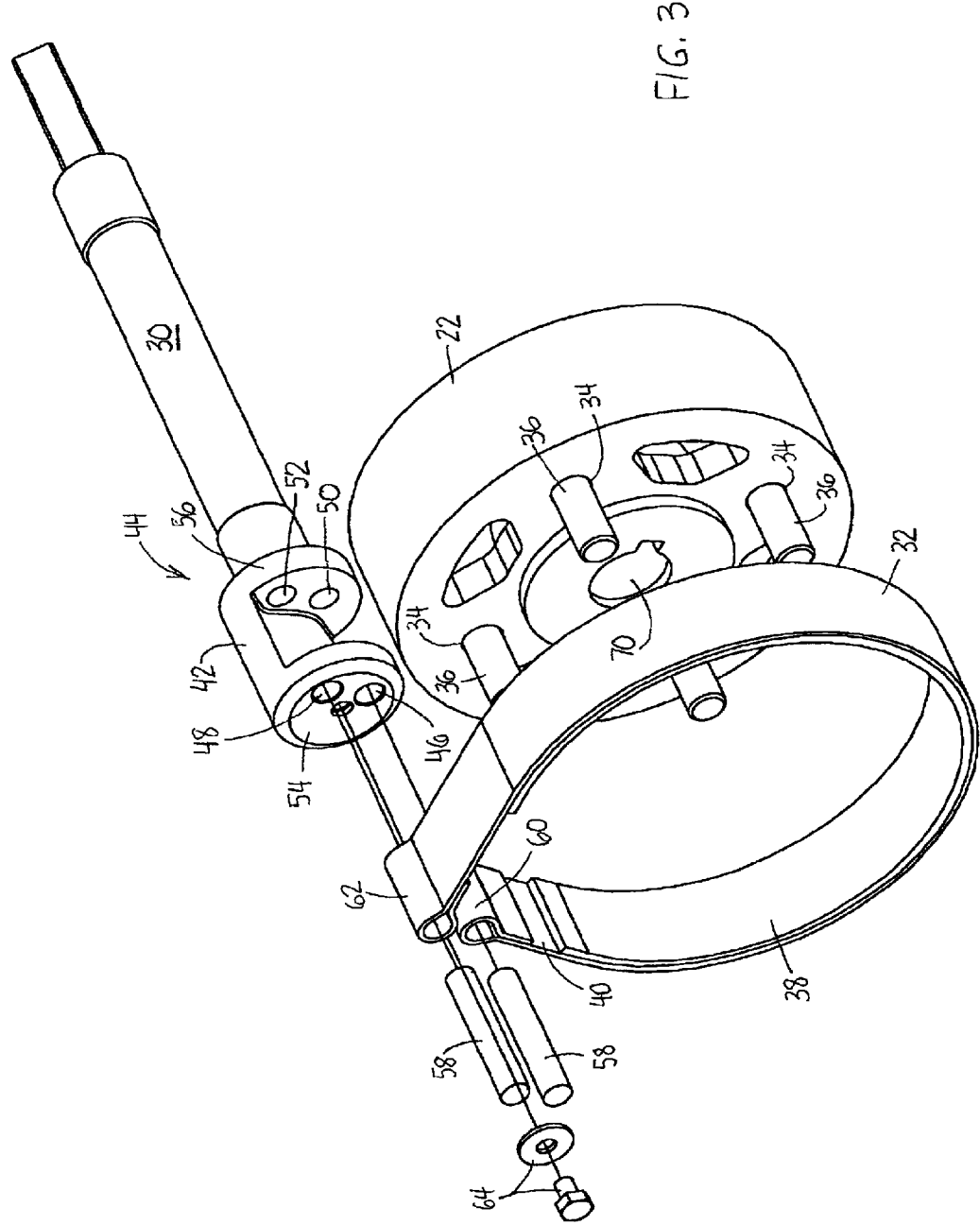
FIG. 3 is an exploded view of the band brake assembly according to FIG. 2.

As shown in FIG. 3, the actuating member 30 of the band assembly 20 includes a cylindrical housing portion or extension 42 on an end 44. The housing portion 42 is open on a face thereof and includes apertures 46, 48, 50, 52 in each of two ends 54, 56. There is provided attachment means including two laterally extending pins 58 for connecting the band with the housing 42 and thus, the actuator 30. Assembly of the band 32 within the housing 42 is shown whereby the pins 58 are first inserted through the end 54 of the housing 42, through the looped ends 60, 62 of the band 32 and then into the opposite end 56 of the housing 42. On the end 56 of the housing 42, the pins 58 are abutted against the inside of the end 56 preventing their further extension through the end 56. On the opposite end 54 of the housing 42, the pins 58 are held in place by a washer and bolt arrangement 68 with the washer bearing against the outer ends of the pins 58 so as to hold them in place.

Figure 4:
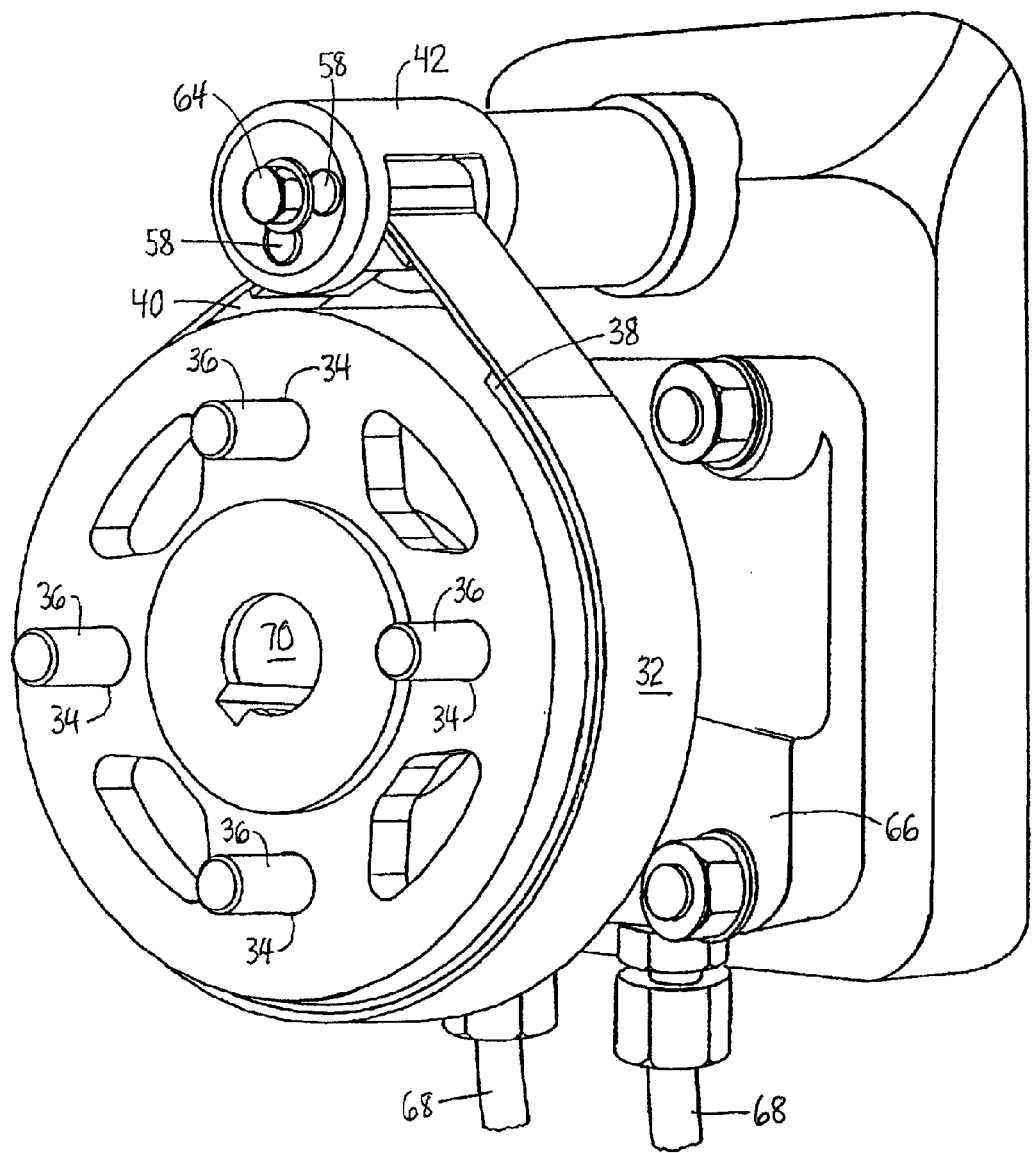
FIG. 4 is a side perspective of the band brake assembly attached to a wheel motor used to transmit force to an intended wheel.

Looking to FIG. 4, the band brake assembly 20 is shown in relation to an associated wheel motor 66 for delivering motion to the attached wheel whereby the motor forms no part of the braking invention herein. Hydraulic lines 68 deliver hydraulic fluid to the motor 66 to permit its operation. Extending through the motor 66 is an axle (not shown) for connection with the drum 22 through its middle aperture 70. Upon operation of the motor 66, the axle will spin and, likewise, cause the drum 22 and its attached wheel to move.

To permit braking of the drum 22 and its attached wheel to occur, an operator will place sufficient force upon the lever 14. Upon this application of force and as seen most clearly in FIG. 3, the band 32 will tighten around the drum 22 causing it to either slow or stop. When braking is attempted, the actuator 30 will rotate and apply the band 32, on either side thereof, to an outer surface of the drum 22 so as to deliver maximum braking. The band 32 is carried in a same direction of rotation as the actuator 30 since it is connected with the actuator 30 through the pins 58. In its rotation, however, the pins 58 are supported on both of their ends and are fixed against rotation within the extension 42 and therefore do not grind against a surface of the actuator 30 since they are fitted and sealed within it. Accordingly, the likelihood of the pins 58 breaking as a result of being impacted by the actuator 30, upon movement of the band 32, is substantially reduced. As force is released from the lever 14 shown in FIG. 1, the actuator 30 will reverse in direction so as to lift application of the frictional layer 38 of the band 32 from the drum 22.

Additionally, as is shown in FIG. 4, the actuator 30 is constructed as cylindrical member with which each end 60, 62 of the band 32 is connected. Construction in this manner, in addition to the motion discussed above, permits the band assembly 20 to be placed within the inner circumference of the wheel to which it is to be attached. Also, the freedom to size and locate components and portions thereof, such as the wheel motor 66, which are necessary for the operation of the wheel is increased.

Thus, there is provided a band brake assembly 20 which delivers maximized braking capacity while decreasing the likelihood of yielding of the pins 58 on which the band 32 is connected. Also, there is provided a band assembly 20 which enables placement thereof inside an intended wheel so as to maximize the design and placement of its and other components necessary to conduct motion of the wheel.

Having described the preferred embodiment, it will become apparent that various modifications can be made without departing from the scope of the invention as defined in the accompanying claims.

I claim:

1. A brake assembly comprising:
   a) a lever for causing braking of a rotatable member;
   b) a cylindrical drum securable to a rotatable member;
   c) a cylindrical band securable with the drum, the band having frictional material disposed on an inner surface thereof so as to be engageable with the drum and resist motion of the rotatable member upon engagement of said frictional material with the drum;
   d) a cylindrical actuating member for applying force to the band, the actuating member being connected with the lever, the band moving in the same direction as the member when force is applied to the drum upon movement of-the lever; and
   e) the actuating member includes a substantially cylindrical extension on an end thereof, the extension having first and second ends that include apertures for retaining pins therein, the band being disposed between the first and second ends.

2. A brake assembly comprising:
   a) a lever for causing braking of a rotatable member;
   b) a cylindrical drum securable to a rotatable member;
   c) a cylindrical band securable with the drum, the band having frictional material disposed on an inner surface thereof so as to be engageable with the drum and resist motion of the rotatable member upon engagement of said frictional material with the drum;

d) a cylindrical actuating member for applying force to the band, the actuating member being connected with the lever, the band moving in the same direction as the member when force is applied to the drum upon movement of the lever; and e) the actuating member includes a substantially cylindrical extension on an end thereof, the extension having first and second ends that include apertures for retaining pins therein, the band being disposed between the first and second ends of the extension and also including a pair of ends through which the pins are inserted for connecting the band with the actuating member.

3. A brake assembly comprising:

a) a lever for causing braking of a rotatable member;

b) a cylindrical drum securable to a rotatable member;

c) a cylindrical band securable with the drum, the band having frictional material disposed on an inner surface thereof so as to be engageable with the drum and resist motion of the rotatable member upon engagement of said frictional material with the drum;

d) a cylindrical actuating member for applying force to the band, the actuating member being connected with the lever, the band moving in the same direction as the member when force is applied to the drum upon movement of the lever; and e) the actuating member includes a substantially cylindrical extension on an end thereof, the extension having first and second ends that include apertures for retaining pins therein, the band being disposed between the first and second ends and also including a pair of looped ends through which the pins are inserted for connecting the band with the actuating member.

* * * * *